(12) United States Patent
Takamura

(10) Patent No.: US 7,357,594 B2
(45) Date of Patent: Apr. 15, 2008

(54) METHOD OF REJUVENATING ROAD SURFACES WITH POLYMER MODIFIED ASPHALT EMULSIONS

(75) Inventor: Koichi Takamura, Charlotte, NC (US)

(73) Assignee: Western Emulsions, Inc., Dana Point, CA (US)

( * ) Notice: Subject to any disclaimer, the term of this patent is extended or adjusted under 35 U.S.C. 154(b) by 168 days.

(21) Appl. No.: 11/104,847

(22) Filed: Apr. 12, 2005

(65) Prior Publication Data

US 2005/0215673 A1    Sep. 29, 2005

Related U.S. Application Data

(62) Division of application No. 10/146,293, filed on May 14, 2002, now abandoned.

(51) Int. Cl.
*B05D 5/00* (2006.01)
(52) U.S. Cl. .......................... 404/75; 427/138
(58) Field of Classification Search ................ 404/72, 404/75; 524/59, 60, 71; 106/273.1, 274, 106/277; 427/138; 428/469; 523/335
See application file for complete search history.

(56) References Cited

U.S. PATENT DOCUMENTS

| | | | |
|---|---|---|---|
| 3,808,020 A | 4/1974 | Pitchford | |
| 3,900,692 A | 8/1975 | Rostler | |
| 3,932,331 A * | 1/1976 | Doi et al. | 106/278 |
| 3,933,710 A * | 1/1976 | Fukushi et al. | 524/61 |
| 4,021,393 A | 5/1977 | McDonald | |
| 4,242,246 A | 12/1980 | Maldonado et al. | |
| 4,453,980 A | 6/1984 | Ward | |
| 4,861,377 A | 8/1989 | Schilling | |
| 5,045,576 A * | 9/1991 | Roeck et al. | 524/60 |
| 5,151,456 A | 9/1992 | Elias et al. | |
| 5,180,428 A | 1/1993 | Koleas | |
| 5,212,220 A | 5/1993 | Gelles | |
| 5,256,708 A | 10/1993 | Ross et al. | |
| 5,364,894 A | 11/1994 | Portfolio et al. | |
| 5,434,539 A * | 7/1995 | Rappoport | 330/138 |
| 5,503,871 A | 4/1996 | Blacklidge et al. | |
| 5,539,029 A | 7/1996 | Burris | |
| 5,674,313 A | 10/1997 | Aoyama et al. | |
| 5,719,215 A | 2/1998 | Liang et al. | |
| 5,749,953 A | 5/1998 | Doyle | |
| 5,772,749 A | 6/1998 | Schilling et al. | |
| 5,811,477 A | 9/1998 | Burris et al. | |
| 5,834,539 A * | 11/1998 | Krivohlavek | 524/60 |
| 5,866,211 A | 2/1999 | Aoyama et al. | |
| 5,891,224 A | 4/1999 | Aoyama et al. | |
| 5,959,007 A | 9/1999 | Liang | |
| 6,074,469 A | 6/2000 | Collins et al. | |
| 6,127,461 A | 10/2000 | Takamura et al. | |
| 6,300,392 B1 | 10/2001 | Takamura et al. | |
| 6,300,394 B1 * | 10/2001 | Fensel et al. | 524/66 |
| 6,348,525 B1 | 2/2002 | Takamura et al. | |
| 6,362,257 B1 | 3/2002 | Chehovits et al. | |
| 6,384,112 B1 | 5/2002 | Boussad | |
| 6,429,241 B1 | 8/2002 | Liang | |
| 6,451,885 B1 | 9/2002 | Dresin et al. | |

FOREIGN PATENT DOCUMENTS

| | | |
|---|---|---|
| JP | 62-138531 A | 6/1987 |
| JP | 01-163265 A | 6/1989 |
| JP | 02-132157 A | 5/1990 |
| JP | 06-041440 A | 2/1994 |
| WO | WO 98/45372 A1 | 10/1998 |

OTHER PUBLICATIONS

Mamlouk, M., et al., "Pavement preventive maintenance: description, effectiveness, and treatments," *Flexible Pavement Rehabilitation and Maintenance, ASTM STP 1348*, P.S. Kandhal et al. (eds.), pp. 121-135, American Society for Testing and Materials: West Conshohocken, PA (1998).

Queiroz, C., et al., "National economic development and prosperity related to paved road infrastructure," *Transportation Research Record, Pavement Management Systems*, No. 1455, pp. 147-152, Transportation Research Board, National Research Council: Washington, DC (1994).

Roberts, F., et al., "Hot mix asphalt materials, mixture, design and construction," *NAPA Research and Education Foundation Textbook*, 2nd ed., (1999).

Takamura, K., "Chapter 14: Applications for asphalt modifications," in *Polymer Dispersions and Their Industrial Applications*, 1st ed., pp. 301-327, D. Urban and K. Takamura (eds.), Wiley VCH Verlag GmbH: Weinheim, DE (2002).

Takamura, K., "Comparison of emulsion residues recovered by the forced airflow and RTFO drying," *AEMA/ISSA Joint Annu. Mtg.*, (Mar. 13-16, 2000).

Takamura, K., et al., "Microsurfacing for preventive maintenance: eco-efficient strategy," *ISSA Annu. Mtg.* (Mar. 2001).

Takamura, K., et al., "SBR synthetic latex in paving applications," *Bitumen Asia 2000*, Singapore, SG (Jun. 20-21, 2000).

* cited by examiner

*Primary Examiner*—Gary S Hartmann
(74) *Attorney, Agent, or Firm*—Dorsey & Whitney LLP; Scott Rothenberger

(57) ABSTRACT

A composition for rejuvenating asphalt pavement according to the present invention comprises an asphalt binder, water, a cationic surfactant, a recycling agent, and a cationic, co-agglomerated styrene butadiene rubber latex, which includes sulfur and a vulcanizing agent. The composition is also useful as a scrub seal, fog seal, sand seal as well as for crack filling and the prevention of reflective cracking. The inventive composition may be used in emulsions with different setup times. The invention also includes a method for treatment of aged and cracked asphalt by application of the disclosed compositions.

4 Claims, No Drawings

METHOD OF REJUVENATING ROAD SURFACES WITH POLYMER MODIFIED ASPHALT EMULSIONS

CROSS-REFERENCE TO RELATED APPLICATION

This application is a divisional application of U.S. application Ser. No. 10/146,293, filed on May 14, 2002.

The present invention relates to asphalt emulsions for treatment of road surfaces. More specifically, the present invention relates to improvements in methods for treatment of aged, cracked or otherwise deteriorated road surfaces paved with asphalt. The improvements provide stronger, more stable and less costly emulsions than those previously available.

BACKGROUND OF THE INVENTION

The annual worldwide consumption of asphalt for road surfacing applications exceeds 90,000,000 tons. Europe and North America are responsible for approximately two thirds of this consumption. In the United States more than four million miles of roads are paved with asphalt. Asphalt pavement deteriorates with use, due to oxidation of asphalt binder, high loads and varying climatic conditions. A recent study demonstrates a statistically significant relationship between a country's economic development and its road infrastructure[1] Accordingly, maintenance and rejuvenation of asphalt surfaced roads is a matter of some importance. In developed countries it is understood that preventative maintenance of existing roadways is preferable to replacement[2]. Accordingly, improvement in the technology for maintaining existing roadways is desirable.

[1] C. Queroz, R. Haas, and Y Cai, "National Economic Development and Prosperity Related to Paved Road Infrastructure" TransportationResearchRecord,1455 (1994).
[2] M. S. Mamlouk and J. P. Zaniewske, "Pavement Preventive Maintenance: Description, Effectiveness, and Treatments", Symposium on Flexible Pavement Rehabilitation and Maintenance, ASTM STP 1349, 121-135, 1999.

Asphalt road surfaces typically consist of asphalt and aggregate. Oxidation of asphalt binder during its service time, climate conditions and use of road surfaces, particularly by heavy loads, result in deterioration of the road surfaces over time. For example, repeated contraction of the road surface during the cold winter nights due to temperature changes results in formation of perpendicular cracks in pavement, known as cold fractures. The asphalt binder becomes too soft during the hot summer days, resulting in a permanent deformation of the road surface under repeated heavy loads, termed "rutting". In addition, as a result of continuous mechanical stress, road surfaces become fatigued, resulting in formation of alligator skin-like cracks, known as fatigue fracture.

One approach to the progressive deterioration of asphalt pavement is to remove and replace the existing pavement with either newly prepared or recycled pavement. However, removal and replacement is expensive and wasteful[3]. A preferable approach involves surface treatment of the existing pavement to restore the pavement to its condition when first laid down[4]. For example, U.S. Pat. No. 5,180,428 to Richard D. Koleas discloses a composition including asphalt, a recycling agent, a polymer and an emulsifying agent in an aqueous solution that when deposited upon aged and cracked asphalt pavement rejuvenates the pavement by replenishing solvent oils (maltenes) driven off by wear and exposure to the elements. The '428 patent is expressly incorporated herein by reference.

[3] F. L. Roberts, P. S. Kandhal, E. R. Brown, D. Y. Lee, T. W. Kennedy, "Hot Mix Asphalt Materials, Mixture Design and Construction", NAPA Research and Education Foundation Textbook, 2$^{nd}$ Edition, 1999.
[4] K. Takamura, K. P. Lok, R. Wittlinger, "Microsurfacing for Preventive Maintenance: Eco-Efficient Strategy", ISSA Annual Meeting, March 2001.

The invention of the '428 patent is sold under the mark "PASS." PASS is also used as a tack coat, chip seal, scrub seal and fog seal as well as for crack filling. An advantage of PASS is that it can be applied in a single step, over existing pavement. Moreover, PASS rejuvenates and prevents further oxidation of the underlying pavement. Moreover, PASS can be applied over a wide temperature range.

Recent studies of the mechanism by which PASS acts on pavement confirm that it rejuvenates old asphalt by restoring the aromatic content of the asphalt in the underlying pavement, and forms a polymer rich, thin, stress absorbing membrane, which strongly adheres to the underlying pavement. Thus PASS prevents reflective crack formation when other types of the surface treatment (i.e, microsurfacing and slurry seal) are applied on the PASS treated pavement.

OBJECTS OF THE INVENTION

Although the invention of the '428 patent continues to be a substantial commercial success, there continues to be a need for asphalt modifiers with performance that is superior to PASS, yet that can be manufactured at a lower cost. Accordingly it is an object of the invention to provide a modifier for asphalt paving that provides improved flexibility, faster setup time, and superior performance at low temperatures. These and other advantages of the present invention are described in detail below.

SUMMARY OF THE INVENTION

A composition for rejuvenating asphalt pavement according to the present invention comprises an asphalt binder, water, a cationic surfactant, a recycling agent, and a cationic coagglomerated styrene butadiene rubber latex, which includes sulfur and a vulcanizing agent. The composition is also useful as a scrub seal, fog seal, sand seal as well as for crack filling and prevention of reflective cracking. The inventive composition may be used,in emulsions with different setup times. The invention also includes a method for treatment of aged and cracked asphalt pavement by application of the disclosed composition.

DETAILED DESCRIPTION OF THE INVENTION

The present invention relates to an improved asphalt emulsion for restoring and rejuvenating aged, cracked and deteriorated asphalt pavement. The invention reflects an improvement over U.S. Pat. No. 5,180,428. More specifically, the disclosed invention improves on the performance of the modifier of the '428 patent by providing a stronger, more flexible surface, useful over a wider range of climatic conditions, yet at a lower cost.

The following sections describe the preparation of the various components of the invention.

At the outset, it should be understood that the invention is a mixture of components that interact with one another. As a consequence, the concentration of one component may be increased if the concentration of another is decreased, without altering the properties of the resulting emulsion.

Asphalt and Recycling Agent

A wide variety of asphalts may be used in connection with the invention. However, asphalts that are rich in saturates should be avoided. Asphalts ranging from AC-5 to AC-30 may be used.

A key aspect of the invention is providing a sufficient quantity of maltenes, which are the non-asphaltene fraction of asphalt, and often referred to as the deasphalted or deasphaltened oil. The maltene fraction of asphalt consists of polar resins, and aromatic and saturate solvents. PASS, as well as the present invention, works best with a recycling agent that is rich in aromatics and resins, with small amounts of saturates. The maltene oils may be provided by the asphalt or the recycling agent. If the asphalt is low in maltenes, the deficiency may be made up by increasing the amount of recycling agent used. It has been discovered that a sufficient amount of recycling agent is present when the viscosity of the mixture of recycling agent and asphalt lies between 1,000 and 3,000 centipoise at 60° C.

A range of different asphalts will be used depending on the desired time for setup and climate, especially maximum and minimum road surface temperature, in summer and winter, respectively. For example, an AC-5 asphalt is preferred for a quick break emulsion, and cold climate. An AC-10 to 20 asphalt will be used for an intermediate setup, such as a sand seal, and an AC-20-30 for a slow setup and/or hotter regions.

The preferred recycling agents are available from Sunoco under their Hydrolene® brand ashpalt oils. Asphalt oils meeting the ASTM standard D4552, and classified as RA-1 are preferred for harder asphalt, such as AC-20 and AC-30. RA-5 oils may also be used with lower viscosity asphalt, such as AC-5.

Preparation Of Styrene Butadiene Latex

The styrene-butadiene rubber ("SBR") latex dispersion of the invention is preferably prepared using a low temperature method as discussed, e.g., in R. W. Brown et al., "Sodium Formaldehyde in GR-S Polymerization", Industrial and Engineering Chemistry, vol. 46, pp. 1073 (1954) and B. C. Pryor et al., "Reaction Time for Polymerization of Cold GR-S" Industrial and Engineering Chemistry, vol. 45, pp. 1311 (1953), both of which are incorporated by reference herein in their entirety. In particular, the SBR latex is prepared by polymerizing styrene and butadiene monomers at a temperature less than or equal to about 25° C., and more preferably between 5° C. and 25° C., in an aqueous emulsion polymerization reaction. The styrene-butadiene rubber latex dispersion used in the invention is preferred to be non-functionalized, i.e., is preferably prepared by polymerizing monomers consisting essentially of styrene, and butadiene. In particular, the styrene-butadiene rubber latex dispersion used in the invention is preferably substantially free (e.g. less than 1% by weight based on total monomer weight) of functional monomers such as hydrophilic monomers (e.g. vinyl carboxylic acids such as acrylic acid, methacrylic acid, itaconic acid and fumaric acid), which are used to produce carboxylated, polystyrene-butadiene, XSB, latex dispersions. More preferably, the styrene-butadiene rubber latex dispersion of the invention is prepared by polymerizing a mix of monomers that includes styrene, butadiene and that is free of functional monomers. For example, the styrene-butadiene rubber latex dispersion can be prepared by polymerizing monomers consisting only of styrene, butadiene or it could be only with butadiene for special cases.

The SBR polymer latex used in the present invention can be produced using either a continuous or batch process. In a preferred embodiment, the SBR polymer latex is produced using a continuous method by continuously feeding a monomer stream, a soap stream and an activator stream to a series of reactors. The monomers in the emulsion stream are preferably fed at a butadiene to styrene weight ratio from about 70:30 to about 78:22.

The soap stream includes a soap, a free radical generator (e.g. organic peroxide) that is used in the redox initiator system, and water. The soap in the emulsion stream is preferably a natural soap such as sodium or potassium oleate or the sodium or potassium salt of rosin acid. The soap is typically present in the emulsion feed in an amount from about 0.5 to about 5 weight percent, based on total monomer weight.

The free radical generators used in the soap stream generally include organic peroxygen compounds such as benzoyl peroxide, hydrogen peroxide, di-t-butyl peroxide, dicumyl peroxide, 2,4-dichlorobenzoyl peroxide, decanoyl peroxide, lauroyl peroxide, diisopropylbenzene hydroperoxide, cumene hydroperoxide, p-menthane hydroperoxide, -pinene hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, and the like, as well as alkyl perketals, such as 2,2-bis-(t-butylperoxy)butane, ethyl 3,3-bis(t-butylperoxy)butyrate, 1,1-di-(t-butylperoxy) cyclohexane, and the like. Preferably, the free radical generator includes diisopropylbenzene hydroperoxide or p-methane hydroperoxide. The free radical generator is typically present in an amount between about 0.01 and 1% by weight based on total monomer weight.

The activator stream includes the other components of the redox initiator system. In particular, in addition to the free radical generator fed with the soap stream, the redox initiator system includes a reducing agent and a water-soluble metal salt of iron, copper, cobalt, nickel, tin, titanium, vanadium, manganese, chromium or silver.

Suitable reducing agents for use in the initiator stream include sulfur dioxide; alkali metal disulfites; alkali metal and ammonium hydrogen sulfites; thiosulfate, dithionite and formaldehyde sulfoxylates; hydroxylamine hydrochloride; hydrazine sulfate; glucose and ascorbic acid. Preferably, the reducing agent is sodium formaldehyde sulfoxylate dihydrate (SFS). The reducing agent is typically present in an amount between about 0.01 and 1% by weight based on total monomer weight. In addition, the weight ratio of reducing agent to free radical generator is preferably between about 0.2:1 and 1:1.

The water-soluble metal salt of iron, copper, cobalt, nickel, tin, titanium, vanadium, manganese, chromium or silver can be chosen from a wide variety of water-soluble metal salts. Suitable water-soluble metal salts include copper (II) amine nitrate, copper (II) metaborate, copper (II) bromate, copper (II) bromide, copper perchlorate, copper (II) dicbromate, copper (II) nitrate hexahydrate, iron (II) acetate, iron (III) bromide, iron (III) bromide hexahydrate, iron (II) perchlorate, iron (III) dichromate, iron (III) formnate, iron (III) lactate, iron (III) malate, iron (III) nitrate, iron (III) oxalate, iron (II) sulfate pentahydrate, cobalt (II) acetate, cobalt (II) benzoate, cobalt (II) bromide hexahydrate, cobalt III chloride, cobalt (II) fluoride tetrahydride, nickel hypophosphite, nickel octanoate, tin tartratte, titanieum oxalate, vanadium tribromide, silver nitrate and silver fluosilicate. The metal can also be complexed with a compound such as ethylene diamine tetracetic acid (EDTA) to increase its solubility in water. For example, iron/EDTA complexes or cobalt/EDTA complexes can be used. Preferably, the water soluble metal salt is used as an iron (II)

sulfate EDTA complex. The water-soluble metal salt is typically present in an amount less than 0.01% by weight based on total monomer weight.

The polymerization reaction can be conducted in the presence of C8 to C12 mercaptans, such as octyl, nonyl, decyl or dodecyl mercaptans, which are used as molecular weight regulators or chain transfer agents to reduce the molecular weight of the SBR polymer. Typically, either n-dodecyl or t-dodecyl mercaptan is used and t-dodecyl mercaptan is the most commonly used. The amount of t-dodecyl mercaptan used will depend upon the molecular weight that is desired for the SBR. Larger quantities of t-dodecyl mercaptan cause greater reductions in the molecular weight of the SBR. The amount of t-dodecyl mercaptan is preferably between about 0.05 and 0.5%.

The monomer feed, soap feed and activator feed are separately fed to a reactor where polymerization of the styrene and t-butadiene monomers occurs. The total amount of water in the reactors is typically 60-75% by weight based on total monomer weight. The emulsion polymerization reaction normally produces between about 60% and about 80% conversion of the styrene and butadiene monomer into poly(styrene-butadiene) or SBR particles.

Once the above level or conversion is reached, the polymerization reaction is terminated by addition of a shortstop to the last of the reactors in series, which reacts rapidly with free radicals and oxidizing agents, thus destroying any remaining initiator and polymer free radicals as well as preventing the formation of new free radicals. Exemplary shortstops include organic compounds possessing a quinoid structure (e.g., quinone) and organic compounds that may be oxidized to quinoid structures (e.g. hydroquinone), optionally combined with water soluble sulfides such as hydrogen sulfide, ammonium sulfide or sulfides or hydrosulfides of alkali or alkaline earth metals; N-substituted dithiocarbamates; reaction products of alkylene polyamines, with sulfur containing presumably sulfides, disulfides, polysulfides and/or mixtures of these and other compounds; dialkylhydroxylamines; N,N'-dialkyl-N,N'-methylenebishydroxyl-amines; dinitrochlorobenzene; dihydroxydiphenyl sulfide, dinitrophenylbenzothazyl sulfide and mixtures thereof. Preferably, the shortstop is hydroquinone or potassium diethyl dithiocarbamate. The short stop is typically added in an amount between about 0.01 and 0.1% by weight based on total monomer weight.

As mentioned, the SBR polymer can also be produced using a batch process. In the batch process, the monomers, the soap, the free radical generator and water are all added to the reactor and agitated. After reaching the desired polymerization temperature, an activator solution, including the reducing agent and one of the previously water soluble metal salts are added to initiate polymerization. A short stop is added to terminate the polymerization once the desired conversion level is reached.

Once polymerization is terminated (in either the continuous or batch process), the unreacted monomers are then typically removed from the latex dispersion. For example, the butadiene monomers can be removed by flash distillation at atmospheric pressure and then at reduced pressure. The resulting styrene monomers can be removed by steam stripping in a column. The resulting SBR latex at this point typically has a solids content of less than 50%. The SBR latex is then preferably agglomerated, e.g., chemical, freeze or pressure agglomeration, and water is removed to increase the total solids content up to about 72%.

When polymerization is terminated, butadiene and styrene monomers removed, the solids content is below 50%, and also latex particle size is below 100 nm, typically 50-70 nm. For these small particles and very narrow size distribution, the latex viscosity becomes above 1000 cP (1 Pas) at above 50% solids content. This latex is then agglomerated to produce larger particles, with a distribution of particle size ranging from 100 nm to between 2 and 3 microns. The result is to substantially decrease the viscosity of the latex, to about 50 mPas or less at about 50%. Even after removal of water, leaving the solids content at 70-72%, the viscosity of the SBR latex is below 2000 cP (2 Pas).

Agglomeration can be carried out by two basic chemical or physical methods. Agglomeration processes are described in detail in Polymer Latices, Science and Technology, Volume 2: Types of Latices by D. C. Blackley, $2^{nd}$ Edition, Chapman & Hall. The presently preferred methods are physical methods. The physical methods include (a) agglomeration by subjecting the latex to freezing and thawing, and (b) agglomeration by subjecting the latex to mechanical agitation. Freeze agglomeration simply involves freezing the latex dispersion, followed by thawing. The result is to produce larger size latex particles, with a broader distribution of particle size. Agglomeration by mechanical agitation may be effected by pumping the latex through a confined space, which subjects the latex dispersion to high pressure, and thus causes agglomeration of the latex particles.

Coagglomeration may be defined as a process in which the particles of two or more dissimilar latices are agglomerated to form heterogeneous composite particles in which the particles of one type of latex have become embedded in the particles of another, but otherwise retain their identity. Coagglomeration has been applied particularly to mixtures of synthetic latices of rubbery polymer and glassy polymers. The objective is to produce latices which contain composite particles comprising both rigid domains and rubbery domains. Films dried down from such latices comprise an intimate mixture of the two types of particles, and in consequence exhibit some degree of particulate reinforcement.

U.S. Pat. No. 6,127,461 "Co-agglomeration Of Random Vinyl Substituted Aromatic/Conjugated Diolefin Polymer With Sulfur To Improve Homogeneity Of Polymer/asphalt Mixtures," by K. Takamura et. al, further extends this co-agglomeration process to beyond polymer latices. The '461 patent refers to coagglomeration of SBR latex and/or polybutadiene particles with organic and inorganic particles including sulfur and a vulcanizing agent as an accelerator. In that invention, co-agglomeration means that the latex particles are agglomerated with another solids dispersion, including semi-micron size organic and inorganic particles. The result is that the solids dispersions, such as sulfur and vulcanizing agent are agglomerated within the latex polymer particles.

With regard to the present invention, more specifically, elemental sulfur is added at 2% as a dispersion is preferred. Bostex 410 (68% elemental sulfur as a dispersion), available from Akron Dispersions is most preferred. The preferred vulcanizing agent is diphenylguanidine, available as Paracure DPG-38 from Parachem Specialties, which is added at 0.2%. Co-agglomeration may be carried out by either of the methods already discussed. Freeze coagglomeration involves a single cycle of freezing and thawing, followed by removal of water. For pressure coagglomeration the mixture is subjected to high shear. An important advantage of co-agglomeration of the asphalt emulsion of the present invention is that the sulfur and accelerator are not diluted, but remain at a relatively high concentration.

Asphalt Emulsion

Asphalt emulsions used in road construction and maintenance are either anionic or cationic, based on the electrical charge of the asphalt particles, which is determined by the type of the emulsifying agent used. The asphalt contents of these emulsions are, in most cases, from 55 to 75% and prepared using a high shear mechanical device such as a colloid mill. The colloid mill has a high-speed rotor that revolves at 1,000-6,000 rpm with mill-clearance settings in the range of 0.2 to 0.5 mm. A typical asphalt emulsion has a mean particle size of 2-5 micrometer in diameter with distribution from 0.3 to 20 micrometer. U.S. Pat. No. 5,180,428 refers to a non-ionic surfactant for ease of emulsion preparation with non-ionic chloroprene latex. This invention employs a cationic emulsifier-cationic latex, or non-ionic emulsifier-cationic latex combination for better asphalt adhesion to aggregate, which results in enhanced asphalt antistripping capability.

Cationic emulsifying agents useful in the preparation of asphalt emulsions in accordance with the present invention are available from Akzo Nobel under the brand Redicote, including Redicote E-4819; E-64R, E4819-3, E-9, E-9A, and E-5. Westvaco cationic emulsifiers sold under the marks Impact SBT, Impact CB1, and CB2, Induline AMS, Qts, Mok-2M and -1M, Indulin MQK, W-5 and 2-1. Arosurf brand cationic emulsifiers made by Goldshmidt for CRS, CMS and CSS are also useful. The emulsifier level in the asphalt emulsion can be ranging from 0.2 to 0.5 percent to the asphalt by weight for the rapid setting emulsion, to as much as 2.0 to 3.0 percent for the slow setting emulsions.

Asphalt emulsions in accordance with the invention may be prepared by mixing the emulsifying agent and co-agglomerated latex into water and adjusting this emulsifier solution to pH below 3 with an inorganic acid. The emulsifier solution could be adjusted from slightly above the room temperature to up to 40° C. Separately, the asphalt is heated to 130 to 160° C., depending upon the viscosity of the asphalt used. For example, a low viscosity asphalt such as AC-5 could be only heated to 130° C., in contrast, it could be as high as 160° C. for AC-20 and AC-30 asphalts. The emulsifier solution and heated asphalt are injected into the colloid mill to produce the asphalt emulsion. The ratio of the asphalt and emulsifier solution is adjusted to produce the asphalt emulsion containing a desired amount asphalt contents, which can be from 55 to 75%.

In the above-described method, the co-agglomerated latex is added into the aqueous emulsifier solution. Alternatively, the asphalt emulsion can be produced with direct injection, where the emulsifier solution without the latex and asphalt are injected into the colloid mill through a series of pipes, while the latex is directly injected into the asphalt line just ahead of the colloid mill. The latex modified asphalt can also be produced by post-addition, where the desired amount of the co-agglomerated cationic latex is added into a pre-manufactured asphalt emulsion prepared without the latex.

Asphalt emulsions are classified with their charge and on the basis of how quickly the asphalt will coalesce, which is commonly referred to as breaking, or setting. The terms RS, MS and SS have been adopted to simplify and standardize this classification. They are relative terms only and mean rapid-setting, medium-setting and slow setting. A rapid setting, RS, emulsion has little or no ability to mix with an aggregate. A medium setting, MS, emulsion is expected to mix with coarse but not fine aggregate, and a slow setting, SS, emulsion is designed to mix with fine aggregate. The cationic emulsions are denoted with the letter "C" in front of the emulsion type, and the absence of the "C" denotes anionic. Thus CRS is a cationic rapid setting emulsion typically used for chip seal application. This new invention disclosed herein utilizes the cationic latex instead of non-ionic, thus opens new possibilities of preparing the asphalt emulsions having different setting characteristics such as CRS, CMS, and CSS to take advantages of well-practiced industrial methods for producing the asphalt emulsions for specific applications, such as chip seal, slurry seal, micro-surfacing, sand seal, fog seal, etc., by choosing desired types and amount of cationic emulsifiers to prepare the emulsion.

EXAMPLE 1

PASS emulsion without latex polymer was obtained from Western Emulsion. This emulsion was produced according to their original patent with Oxnad AC-20 asphalt, RA-1 and non-ionic surfactant (Indulin XD-70 from WestVaco). Neoprene and cationic co-agglomerated SBR latex modified PASS emulsions were prepared by adding desired amount of the latex dispersion into this unmodified emulsion. The asphalt emulsion residue was recovered at room temperature by drying the emulsion for 1 day under forced airflow described in (K. Takamura, Comparison of emulsion residues recovered by the forced airflow and RTFO drying, AEMA/ISSA Proceedings, 2000, 1-17). Table 1 lists measured complex modulus of the emulsion binder at 50° C. as a function of the polymer content in the PASS emulsion.

TABLE 1

Measured complex modulus of the emulsion residue at 50° C.

| Latex type | Polymer level in the emulsion | | |
|---|---|---|---|
| | 1% | 2% | 3% |
| Neoprene | 0.70 | 0.8 | 0.85 |
| SBR Latex | 0.83 | 1.1 | 1.2 |

The complex modulus represents the strength of the emulsion residue under controlled stress and strain representing the traffic condition. One day drying under forced airflow represents initial strength development of the asphalt emulsion binder after application. Table 1 demonstrates that the cationic coagglomerated SBR latex develops the strength at lower polymer level than the Neoprene latex.

EXAMPLE 2

The strength development of the PASS emulsion binder for few weeks to months after application was tested using the same Dynamic Shear Rheometry. Here, The PASS emulsions containing 2% and 3% polymer by weight against asphalt+RA-1 were dried as example 1. After 1 day forced airflow drying, the emulsion residue was stored in an oven at 60° C. for 10 days and the complex modulus of the residue was measured at 1 day, 3 days, 7 days and 10 days curing in the oven at 60° C. This temperature represents the maximum road surface temperature in use. Table 2 and 3 list measured complex modulus as a function of curing time. These results clearly demonstrate early strength development of the PASS emulsion modified with Cationic co-agglomerated SBR latex against Neoprene modified PASS emulsion.

TABLE 2

Complex modulus of the cured emulsion residue at 50° C.

| | Curing time in the oven at 60° C. | | | | |
|---|---|---|---|---|---|
| | 0 day | 1 day | 3 day | 7 day | 10 day |
| 2% polymer | | | | | |
| Neoprene | 0.80 | 1.1 | 1.1 | 1.2 | 1.4 |
| SBR Latex | 1.1 | 1.5 | 1.8 | 2.0 | 2.1 |
| 3% Polymer | | | | | |
| Neoprene | 0.85 | 1.2 | 1.6 | 1.7 | 2.2 |
| SBR Latex | 1.2 | 2.0 | 2.3 | 2.3 | 2.3 |

The invention has been disclosed in terms of various embodiments. Those embodiments are merely illustrative, and should not be understood as limiting the scope of the invention, which is instead defined by the claims appended hereto.

I claim:

1. A method for rejuvenating deteriorated asphalt pavement comprising applying to deteriorated asphalt pavement a composition comprising an aqueous dispersion of asphalt, a surfactant, a recycling agent, and a co-agglomerated styrene butadiene rubber latex and vulcanizing agent, and drying the dispersion, wherein the complex modulus of the dried composition is 2.3 kPa at 50° C. after 3 days curing at 60° C.

2. The method of claim 1 in which said deteriorated asphalt pavement is cracked.

3. The method of claim 1 in which said surfactant is cationic.

4. The method of claim 1 in which said latex further comprises sulfur.

* * * * *